United States Patent
Taillaert et al.

(10) Patent No.: US 7,065,272 B2
(45) Date of Patent: Jun. 20, 2006

(54) FIBER-TO-WAVEGUIDE COUPLER

(75) Inventors: Dirk Taillaert, Bredene (BE); Roel Baets, Deinze (BE)

(73) Assignee: Interuniversitair Microelektronica Centrum (IMEC vzw), Leuven (BE)

( * ) Notice: Subject to any disclaimer, the term of this patent is extended or adjusted under 35 U.S.C. 154(b) by 0 days.

(21) Appl. No.: 10/410,825

(22) Filed: Apr. 10, 2003

(65) Prior Publication Data
US 2003/0235370 A1  Dec. 25, 2003

(30) Foreign Application Priority Data
Apr. 10, 2002  (GB) ........................................... 02080255

(51) Int. Cl.
G02B 6/34 (2006.01)
G02B 6/26 (2006.01)
G02B 6/42 (2006.01)

(52) U.S. Cl. ............................. 385/37; 385/44; 385/47; 385/50; 359/563; 398/87

(58) Field of Classification Search ............. 385/14–15, 385/24, 28, 31, 37–38, 44, 47, 49–50, 129–132, 385/1–4, 8, 125.16, 112, 41; 359/337.21, 359/558, 563, 576; 398/84, 87; 369/112; 350/96.16
See application file for complete search history.

(56) References Cited

U.S. PATENT DOCUMENTS

| | | | | |
|---|---|---|---|---|
| 4,776,661 A | * | 10/1988 | Handa | 385/37 |
| 4,869,568 A | * | 9/1989 | Schimpe | 385/14 |
| 5,146,518 A | * | 9/1992 | Mak et al. | 385/41 |
| 5,208,800 A | * | 5/1993 | Isobe et al. | 369/112.27 |

(Continued)

FOREIGN PATENT DOCUMENTS

| | | |
|---|---|---|
| EP | 0738907 | 10/1996 |
| JP | 200262554 | 2/2002 |
| WO | WO 0214913 | 2/2002 |

OTHER PUBLICATIONS

"Single–Mode Fibers *Fundamentals*", Neumann, Chapter 5, Sec. 3.5, Bergische Universität Gesamthochschule Wuppertal, Fachbereich Electrontechnik, Springer–Verlag Berlin Heidelberg © 1998.

"A high–efficiency out–of–plane fibre coupler for coupling to high index contrast waveguides", Taillaert et al., Proceedings 27$^{th}$ European Conference on Optical Communication, Sep. 30–Oct. 4, 2001, Amsterdam, The Netherlands, postdeadline paper Th.F.1.4., p. 30–31.

"A Short Polarization Splitter Without Metal Overlays on InGaAsO—InP", van der Tol, et al., IEEE Photonics Technology Letters, vol. 9, No. 2, Feb., 1997.

(Continued)

*Primary Examiner*—Frank G. Font
*Assistant Examiner*—Ryan Lepisto
(74) *Attorney, Agent, or Firm*—McDonnell Boehnen Hulbert & Berghoff LLP

(57) ABSTRACT

An optical waveguide to fiber coupler comprises a substrate, a first waveguide and a second waveguide. The first and second waveguides are formed on the substrate and intersect at a right angle. A diffraction grating structure is formed at the intersection of the first and second waveguides, such that, when the coupler is physically abutted with a single mode optical fiber, in operation, a polarization split is obtained that couples orthogonal modes from the single-mode optical fiber into single identical modes in the first and second waveguides. Also, employing the coupler in optical polarization diverse applications provides for implementing a polarization insensitive photonic integrated circuit using such diffraction grating structures, such as, for example, photonic crystals.

22 Claims, 5 Drawing Sheets

U.S. PATENT DOCUMENTS

| | | | | |
|---|---|---|---|---|
| 5,420,947 A | * | 5/1995 | Li et al. | 385/37 |
| 5,581,642 A | * | 12/1996 | Deacon et al. | 385/15 |
| 5,664,032 A | * | 9/1997 | Bischel et al. | 385/4 |
| 5,790,730 A | * | 8/1998 | Kravitz et al. | 385/49 |
| 6,198,860 B1 | | 3/2001 | Johnson et al. | 385/28 |
| 6,259,841 B1 | * | 7/2001 | Bhagavatula | 385/47 |
| 6,310,991 B1 | | 10/2001 | Koops et al. | 385/14 |
| 6,542,682 B1 | * | 4/2003 | Cotteverte et al. | 385/125 |
| 6,640,034 B1 | * | 10/2003 | Charlton et al. | 385/122 |
| 6,768,834 B1 | * | 7/2004 | Gruhlke | 385/24 |
| 2002/0008215 A1 | | 1/2002 | Evans | 250/559.13 |
| 2003/0223117 A1 | * | 12/2003 | Nakazawa et al. | 359/576 |
| 2004/0184156 A1 | * | 9/2004 | Gunn et al. | 359/629 |

OTHER PUBLICATIONS

"Highly Directional Grating Outcouplers with Tailorable Radiation Characteristics", Niklas Eriksson, Mats Hagberg, Anders Larsson, IEEE Journal of Quantum Electronics, vol. 32, No. 6, Jun. 1996.

"An Out–of–Plane Grating Coupler for Efficient Butt–Coupling Between Compact Planar Waveguides and Single–Mode Fibers", Kirk Tailiaert, et al., IEEE Journal of Quantum Electronics, vol. 38, No. 7, Jul. 2002.

"Buried–Oxide Silicon–on–Insulator Structures II: Waveguide Grating Couplers", Robert M. Emmons, et al., IEEE Journal of Quantum Electronics, vol. 28, No. 1, Jan. 1992.

PCT International Search Report for PCT applicaiton of Interuniversitair Micro–Elektronica Centrum, EP 03 44 7088 dated Dec. 1, 2003.

Attila Mekis and J.D. Joannopoulos "*Tapered Couplers for Efficient Interfacing Between Dielectric and Photonic Crystal Waveguides*", Journal of Lightwave Technology, IEEE, vol. 19, No. 6, pp. 861–865, Jun. 2001.

* cited by examiner

FIBER-TO-WAVEGUIDE COUPLER

CROSS REFERENCE TO RELATED APPLICATIONS

The present application claims priority under 35 U.S.C. § 119(a) to Great Britain provisional application GB 0208255.0, filed on Apr. 10, 2002, the entire disclosure of which is herein incorporated by reference.

BACKGROUND

1. Field

This invention relates to integrated optical components and, more specifically, to integrated optical fiber to waveguide couplers.

2. Description of Related Technology

Integrated optical devices (e.g., photonic integrated circuits) are well suited to applications in various technologies such as telecommunications, instrumentation, signal processing and sensors. In operation, photonic integrated circuits use optical waveguides to implement devices, such as optical switches, optical couplers and wavelength multiplexers/demultiplexers, for example. Such waveguides, when integrated with a photonic integrated circuit, are typically implemented as solid dielectric light conductors, which are fabricated on a substrate in a very similar fashion as semiconductor integrated circuits are manufactured. Waveguides transmit light around optical circuits and also connect to external optical waveguides, such as optical fibers, typically by direct physical abutment of the fiber with the waveguide. However, in such a configuration, a mode mismatch results between the integrated waveguide and the optical fiber. Specifically, because the difference of the refractive index between the core and cladding of a typical waveguide is higher than that of a typical optical fiber, the optical field is more confined in the waveguide than in the fiber.

In addition, waveguide core dimensions are typically smaller than the core dimensions of the optical fiber. Therefore, such directly physically coupled devices typically realize a 7–10 dB insertion loss in optical signal strength. Moreover, for high index contrast waveguides that are used for dense integrated optics, the insertion loss may be as high as 23 dB because of the even smaller dimensions. In this context, the insertion loss of an optical coupler is the difference (or may be expressed as a ratio) of output to input light power at a particular wavelength. Therefore, coupling a cylindrical optical beam from a fiber into a dielectric (essentially planar and rectangular) waveguide structure and back is a challenge and alternative techniques are desirable.

One non-integrated (not part of the waveguide) solution that has been implemented to address the above concerns is the use of lensed fibers. While such lensed fibers can enhance the coupling efficiency from the fiber to the waveguide, such an approach requires very critical and difficult sub-micron alignment.

An integrated solution that has been employed is the use of spot-size converters. In this regard, lateral, in-plane spot-size conversion can be realized with tapered ridge waveguides. However, vertical spot-size conversion is more difficult and requires more complicated structures. For example, one solution for the vertical spot-size conversion problem is the use of a grating coupler to couple light from an out-of-plane optical fiber to a planar waveguide. Such grating couplers using 1-dimensional gratings (grooves) have been extensively studied, both theoretically and experimentally, see R. M. Emmons, D. G. Hall, "Buried-oxide silicon-on-insulator structures: waveguide grating couplers", IEEE J. Quantum Electron., vol. 28., pp164–175, January 1992; and D. Taillaert, W. Bogaerts, P. Bienstman, T. F. Krauss, P. Van Daele, I. Moerman, S. Verstuyft, K. De Mesel, R. Baets, "An out-of-plane grating coupler for efficient butt-coupling between compact planar waveguides and single-mode fibres", IEEE J. Quantum Electron., vol. 38, pp. 949–955, July 2002.

However, existing grating couplers such as described in "Highly directional grating outcouplers with tailorable radiation characteristics" by N. Eriksson, M. Hagberg, A. Larsson, IEEE J. Quantum Electron., vol. 32, no. 6, 1996, p. 1038–1047, have a narrow bandwidth, use a long grating (>100 μm), and work for only one polarization. Therefore, due to these limitations such couplers are not particularly well suited for coupling optical fiber to photonic integrated circuits. A coupler with improved bandwidth and shorter coupling length is disclosed in "A high-efficiency out-of-plane fiber coupler for coupling to high index contrast waveguides", D. Taillaert, W. Bogaerts, P. Bienstman, T. Krauss, I. Moerman, P. Van Daele, R. Baets, Proceedings 27th European Conference on Optical Communication, 30 Sep. –4 Oct. 2001, Amsterdam, The Netherlands, post-deadline paper Th.F.1.4, p. 30–31. This coupler uses a high refractive index contrast periodic structure, also known as photonic crystal, instead of a long grating.

A second issue presented by coupling optical fiber to most photonic integrated circuits is the polarization dependence of those photonic integrated circuits. Because the state of polarization of light in a standard single mode fiber can change, without otherwise accounting for such polarization changes, photonic integrated circuits to which the fiber is coupled would need to operate independent of polarization of the light communicated from the fiber. However, making a large-scale photonic integrated circuit polarization independent is difficult and for some optical functions is not possible. One possible solution to this problem is to use polarization splitter. Such devices, an example of which is described in European Patent 0738907, split the two polarizations into two different waveguides. This solution, however, has the drawback that two different waveguides and two circuits are needed for the two different polarizations. While a polarization converter would solve this problem, these devices are relatively large (as compared to photonic integrated circuits) and, therefore, not well suited for use with integrated optics. Thus, other techniques for implementing optical couplers are desirable.

SUMMARY

An optical coupler in accordance with the invention comprises a first optical waveguide and a second optical waveguide, where the first and second waveguides form an intersection at a right angle. The polarization of light communicated through the first and second waveguides can be the same (e.g. TE or TM in both waveguides). Thus, the invention provides a structure to make polarization independent photonic integrated circuits even if the waveguides and devices used in conjunction with those circuits are polarization selective.

The coupler also comprises an optical grating structure, such as e.g. a diffraction grating, or more generally a waveguide coupler. The grating structure is formed at the intersection of the first and second waveguides. The diffraction grating structure can be a periodic, an essentially or substantially periodic structure, or a non-periodic structure. A diffraction grating structure used according to the present invention may have less than 200 periods, less than 100 periods, less than 70 periods, less than 30 periods, or less than 20 periods. The diffraction grating structure can be used for coupling between a single-mode optical fiber, e.g. an optical fiber whose core is sufficiently narrow so that only two orthogonal polarized waveguide modes can propagate, and planar waveguides.

In this regard, the diffraction grating structure may be a photonic crystal. A photonic crystal is a high refractive index contrast periodic structure. A photonic crystal is thus a periodic structure of which the refractive index is periodic, and the periodicity is of an order relative to the wavelength of light employed, such that it influences diffraction of that light. As an example, for light with a wavelength of 1550 nm, a periodic structure with a period of approximately 600 nm may be used.

The diffraction grating structure can be a two-dimensional (2-dimensional) grating. The 2-dimensional grating may comprise a periodic refractive index modulator, e.g. an array of diffracting microscopic structures such as an array of holes or an array of rods. The diffraction grating may be a 2-dimensional photonic crystal with a square lattice comprising such microscopic structures. Also, the diffraction grating may be a purely or substantially periodic grating structure. Alternatively, the diffraction grating may be a non-periodic grating structure, in which, for example, the holes in the lattice structure of the diffraction grating may have varying areas and/or spacing.

In one embodiment, the diffraction grating structure may be a 2-dimensional photonic crystal, for example, which, as noted above, can be formed at the intersection of the first and second waveguides. These waveguides, which may be ridge waveguides, which are connected to one or more integrated optical circuits using lateral spot-size converters. The diffraction grating structure, e.g. the photonic crystal, in operation, couples light between an out-of-plane fiber abutted with the coupler and the planar ridge waveguides. For such a structure, the overall coupling efficiency is independent of the polarization of the light in the fiber.

In other embodiments, the substrate may have an additional stack of layers forming a substrate reflector under at least one of the waveguides. The substrate reflector may comprise a distributed Bragg reflector (DBR). In yet another embodiment, the waveguides may be ridge waveguides, which may be tapered. In still another embodiment, the coupler may comprise a slab waveguide horizontally formed on the substrate. The slab waveguide may have a layer with a lower refractive index on top as compared to the underlying layers.

The optical coupler according to the present invention may be coupled to an optical fiber. The optical fiber may be a single-mode optical fiber. The coupler may couple orthogonal modes from single-mode optical fiber into identical modes in the first and second waveguides.

A method in accordance with an embodiment of the invention comprises coupling an optical signal having a first mode, e.g. TE, and a second mode, e.g. TM, in an optical transmission element to an optical coupler. The method further comprises splitting the optical signal into the first and the second mode using a diffraction grating structure formed at an intersection of a first and a second waveguide on the coupler; and introducing the first mode, e.g. TE, and the second mode, e.g. TM, in the first and second waveguides so that both modes propagate as the first mode or as the second mode, e.g. both propagate as TE mode or both propagate as TM mode in both waveguides.

BRIEF DESCRIPTION OF THE DRAWINGS

The subject matter regarded as the invention is particularly pointed out and distinctly claimed in the claims section concluding this document. The invention, however, both as to organization and method of operation, together with features and advantages thereof, may best be understood by reference to the following detailed description when read with the accompanying drawings in which:

DETAILED DESCRIPTION

Figure 1:
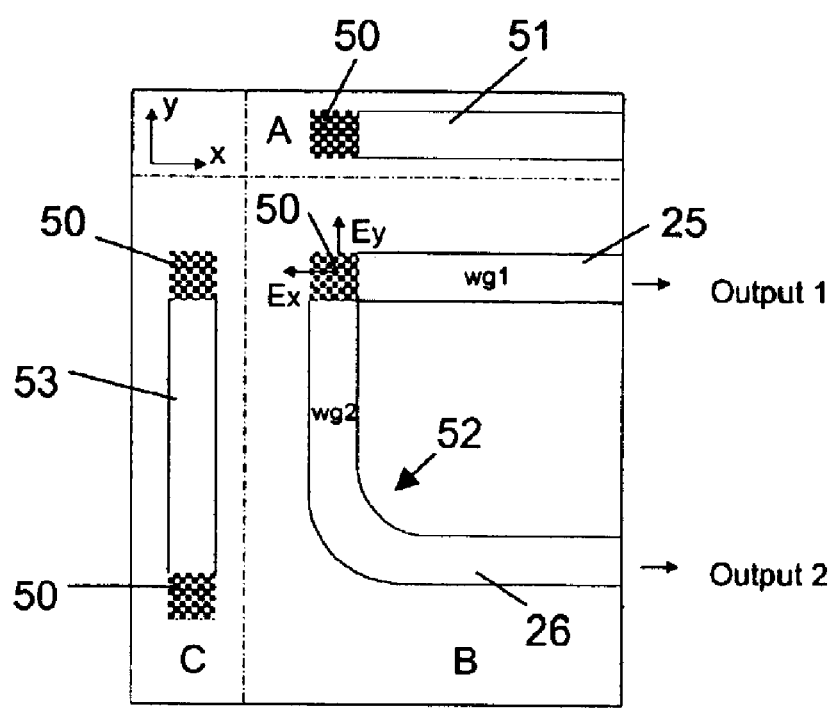
FIG. 1 is a schematic drawing showing a top view of a grating coupler in a single waveguide in Section 'A', a grating coupler used as a polarization splitter according to an embodiment of the invention in Section 'B', and a waveguide with a grating coupler at both ends in Section 'C'.

In the following detailed description, numerous specific details are set forth in order to provide a thorough understanding of the invention and how it may be practiced in particular embodiments. However, it will be understood that the present invention may be practiced without these specific details. In other instances, well-known methods, procedures and techniques have not been described in detail, so as not to obscure the present invention. While the present invention will be described with respect to particular embodiments and with reference to certain drawings, the invention is not limited thereto. The drawings included and described herein are schematic and are not limiting to the scope of the invention. It is also noted that in the drawings, the size of some of the elements may be exaggerated and, therefore, not drawn to scale for illustrative purposes.

It is well known, for example from E. G. Neumannn, "Single-mode fibres—fundamentals", Berlin Heidelberg : Springer-Verlag, 1988, ch. 5, that a single-mode fiber can carry two orthogonal linearly polarized modes. When communicating light into the fiber, the total field will be in an elliptical state of polarization. Also, the state of polarization changes during propagation of the light in the fiber due to polarization mode dispersion, which is known.

Referring now to Section 'A' of FIG. 1, an embodiment of an optical coupler comprising a two-dimensional (2-D)

grating 50 etched in a ridge waveguide 51 is illustrated. In this context, a grating is an optical device consisting of a pattern of grooves, channels or cavities or holes. If the pattern is in one direction only, the grating is a linear, or one-dimensional (1-D) grating; if the pattern is in two (typically orthogonal) directions, it is a 2-D grating. It is noted that periodic or non-periodic patterns may be used for such gratings. While the grating 50 is shown with a periodic 2-D pattern, it will be appreciated that embodiments of optical couplers in accordance with the invention may comprise periodic and/or non-periodic grating structures, as is discussed further below.

In general, the coupling efficiency from an optical fiber (not shown in FIG. 1) to a waveguide is polarization dependent. For embodiments of waveguides and gratings in accordance with the invention, the coupling efficiency for TE may be much larger than the coupling efficiency for TM. The coupling from an optical fiber to a waveguide as in FIG. 1A is more efficient if the input is linearly polarized in the y direction, e.g., substantially perpendicular to the input of the waveguide.

The structure shown in Section 'B' of FIG. 1 comprises a first ridge waveguide wg1 and a second ridge waveguide wg2 that are orthogonal with respect to each other at their intersection. A 2-D grating, also denoted 50 as in Section 'A' of FIG. 1, is formed, e.g. etched, at the intersection of the waveguides wg1, wg2, and is invariant for a 90-degree rotation. Light communicated from an optical fiber (again, not shown in FIG. 1) that is coupled by physical abutment with the grating 50 with linear polarization and with an electric field Ey will couple to waveguide wg1 and the other polarization with electric field Ex will couple to waveguide wg2. However, in general, elliptically polarized light from a single mode fiber will couple both to waveguides wg1 and wg2. The coupling ratio, e.g. the ratio of the output powers in each of the two waveguides wg1 and wg2, depends on the state of polarization, but the coupling to wg1 and wg2 together is independent of it. For this particular embodiment, the 90-degree bend 52 in waveguide wg2 is for practical reasons so as to have the two outputs at the same cleaved facet. While the above discussion is in the context of an input coupler, the 2-D grating device 50 can also be used as output coupler, e.g. to couple light from a waveguide into an optical fiber.

It is noted that there is an important difference between conventional polarization splitters described in literature, e.g. in J. Van der Tol, J. W. Pedersen, E. G. Metaal, J. Van Gaalen, Y. S. Oei, F. H. Groen, "A short polarization splitter without metal overlays on InGaAsP-InP," IEEE Photonics Tech. Lett., vol.9, pp. 209–211, February 1997, and a coupler used as a splitter according to an embodiment of the invention. In this regard, in a conventional splitter, the input light is split in a TE and a TM waveguide mode, where each polarization is propagated through different but parallel waveguides. In contrast, by employing a device according to an embodiment of the invention, light communicated to such a coupler from an optical fiber is split into two orthogonal waveguide mode and then propagated through the orthogonal waveguides. As the waveguides are orthogonal, the same polarization direction (e.g. TE) is used in both waveguides. Therefore, such a device can be used to implement polarization insensitive photonic integrated circuits, using waveguides that are very strongly polarization sensitive.

Referring to section 'C' of FIG. 1, a waveguide 53 is shown with grating couplers 50 formed at both ends. This structure will be discussed in further detail below with reference to FIG. 8.

Figure 2:
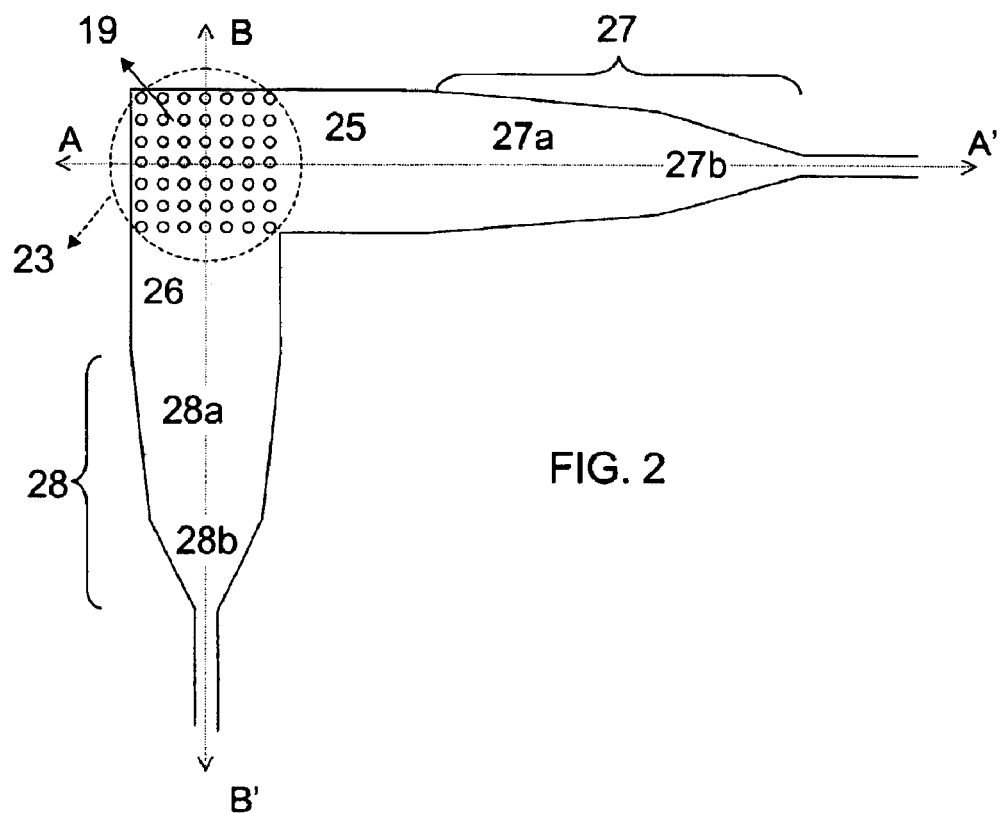
FIG. 2 is a drawing showing a plan view of an embodiment of a photonic coupler in accordance with an embodiment of the invention.
Figure 3:
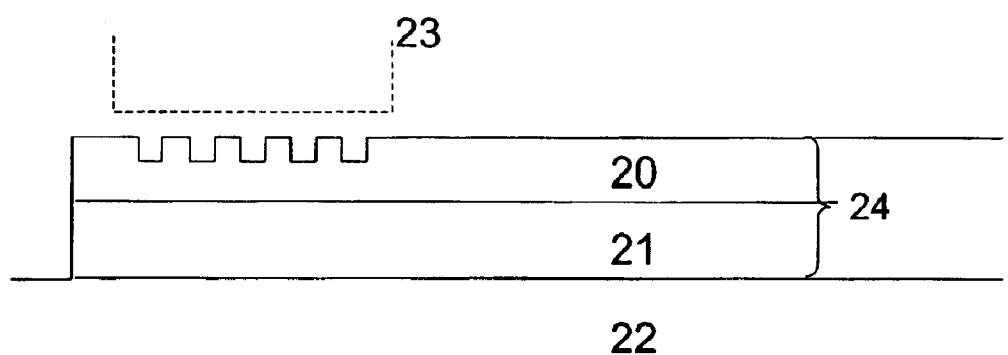
FIG. 3 shows a cross-section of the coupler shown in FIG. 2 along section line A–A'.

Referring now to FIGS. 2 and 3, schematic diagrams illustrating a plan view (FIG. 2) and a cross sectional view (FIG. 3) of an embodiment of a photonic coupler are respectively shown. A 2-D grating structure is used, and for this embodiment, takes the form of a photonic crystal 19. As may be seen in FIG. 2, the photonic crystal 19 is formed at the intersection of two ridge waveguides 25 and 26. As may be seen in FIG. 3, the ridge waveguides 25 and 26 are formed in a slab waveguide 24 on a substrate 22. In this particular embodiment, the slab waveguide 24 comprises a core layer 20 and a cladding layer 21 on top of the substrate 22. The slab waveguide 24 is a layered structure, or a layer stack in which a ridge waveguide is created by removing, e.g. by etching away, some parts of these layers to create a waveguide with a specific width. FIG. 3 is a cross section along section line A–A' of FIG. 2. For such an embodiment, the refractive index of the core layer 20 is higher than the refractive index of the cladding layer 21. In a one embodiment the core layer 20 and the substrate 22 are GaAs with a refractive index of 3.37 and the cladding layer 21 is $AlO_x$ (oxidized AlGaAs) with refractive index of 1.6. This $AlO_x$ may be obtained by wet thermal oxidation of a high (94%) Al-content AlGaAs layer. The thickness of the core layer 20 is 240 nm and the thickness of the cladding layer 21 is 740 nm.

In certain embodiments in accordance with the invention, the photonic crystal 19 is a high refractive index contrast periodic structure. The photonic crystal 19 can be an artificially made structure. For example, it can be an imposed structure of diffracting elements such as rods and/or holes. For example the photonic crystal 19 may be made of tiny bars lined up at regular distances and angles. As one example, the photonic crystal 19 may be made using silicon coated with a polymer.

The photonic crystal 19 of the embodiment shown in FIG. 2 is a periodic 2-D photonic crystal, which consists of a square lattice of holes (the two directions of periodicity are perpendicular to each other). The photonic crystal 19 is a so-called second order photonic crystal, as the period or lattice constant of the photonic crystal is $\lambda/n_{eff}$ where $\lambda$ is a free space wavelength and $n_{eff}$ is an average effective refractive index in the photonic crystal area. In this particular embodiment, the photonic crystal is designed for a free-space wavelength of 1.55 μm. Also, in this embodiment the photonic crystal period is 580 nm, the diameter of the circular holes is 340 nm and the etch depth of the holes is 80 nm. Thus, the photonic crystal is a square 18×18 array of holes (not all shown).

In the embodiment depicted in FIGS. 2 and 3, a single-mode optical fiber 23 is coupled to the coupler device by physically abutting the optical fiber 23 with the photonic crystal 19. The axis of the fiber 23 is perpendicular to the plane of the photonic crystal 19 (and the photonic integrated circuit). As may be seen in FIGS. 2 and 3, the core of the optical fiber 23 is shown as a dashed line. In some circumstances, such as, for example, to avoid unwanted reflection into the fiber, it may be desirable to tilt the fiber 23, and thus place the fiber axis under a certain angle with respect to the direction perpendicular to the plane of the photonic integrated circuit.

Because the array of the photonic crystal 19 is only approximately 10 μm on a side, calculations based on perturbation theory or grating theory for infinitely long gratings do not provide accurate results. Therefore, these parameters for the photonic crystal 19 used in this embodiment have been calculated and adjusted using rigorous electromagnetic simulations based on an eigenmode expansion and propagation method and a finite difference time domain method.

The coupler shown in FIGS. 2 and 3, in general, operates as follows. When a waveguide mode, for example the transverse electric (TE) or the transverse magnetic (TM) mode, is incident on the diffraction grating structure (e.g. photonic crystal 19), the first order diffraction of the photonic crystal 19 creates an upward and downward propagating field (wave). The upward propagating field couples to the optical fiber 23, which is placed above the diffraction grating structure 19. The coupling efficiency for such configurations is defined as the power in the optical fiber 23 divided by the incident power in the waveguides 25 and 26. The directivity is defined as the upward propagating power divided by the downward propagating power. The thickness of the waveguide layers, core layer 20 and cladding layer 21 for this embodiment, are chosen to increase the directivity and coupling efficiency. At the interface of cladding layer 21 and substrate 22, part of the downward propagating wave is reflected upwards. This second upward wave increases the coupling efficiency if it interferes constructively with the first upward propagating wave. The phase difference between the first and the second upward wave is proportional to the thickness and material of cladding layer 21.

The measured coupling efficiency for this preferred embodiment is approximately 30%, which translates to a coupling loss of approximately 5 dB, which is substantially improved over the up to 23 db loss realized by previous approaches. This coupling efficiency is the coupling efficiency for the fundamental TE-mode of the waveguide. The coupling efficiency for the TM mode is negligible. In this respect, the TE-TM extinction ratio is >20 dB. This measured coupling efficiency is for the case of a preferable alignment between the optical fiber 23 and the photonic crystal 19. In this respect, a deviation of 2 μm in a direction along line A–A' or line B–B' in FIG. 2 results in an additional coupling loss of less than 1 dB, which is still improved over prior approaches.

Although a purely periodic photonic crystal 19 is used in the above-described embodiment, it may be desirable under some circumstances to use a more complicated photonic crystal, or more generally, a more complicated diffraction grating structure, to achieve a higher coupling efficiency. For example, the diffraction grating structure does not need to be perfectly periodic and can be substantially periodic or non-periodic. Such alternative grating structures may comprise, without limitation, varied hole diameter or etch depth along line A–A' and/or line B–B', cylindrical holes where the axis of the holes is tilted with respect to the surface of the substrate (also known as blazed grating) or a first order photonic crystal reflector may be located behind the second order coupler section.

Figure 4:
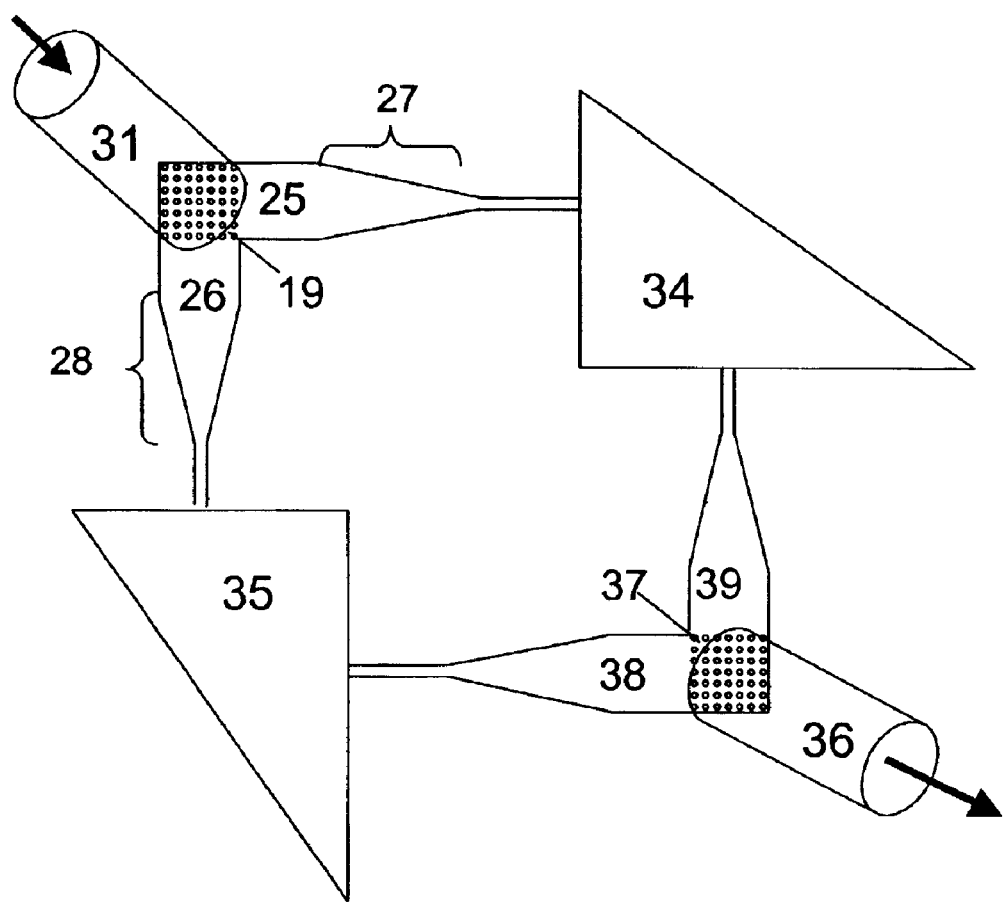
FIG. 4 is a schematic drawing (not to scale) of a polarization independent photonic integrated circuit with input and output couplers according to an embodiment of the invention.

Referring now to FIG. 4, a schematic diagram of an embodiment of a photonic circuit that employs optical couplers such as the coupler shown in FIGS. 2 and 3 is depicted. In this embodiment (as well as others), it may also be desirable to increase the directivity and coupling efficiency by adding distributed Bragg reflectors (DBRs) (not shown) under waveguides 25, 26, 38 and 39. Such DBRs will reflect nearly all the downward propagating light upwards and increase the coupling efficiency if the thickness of the layers is chosen properly so as to cause the reflected light to constructively interfere with an originally upwardly propagating wave. The details of such a DBR layer structure with materials and corresponding thicknesses, is shown below in Table 1.

TABLE 1

DBR structure

| Thickness (nm) | Material |
|---|---|
| 240 | GaAs |
| 760 | AlO$_x$ |
| 115 | GaAs |
| 240 | AlO$_x$ |
| 115 | GaAs |
| 240 | AlO$_x$ |
| Substrate | GaAs |

The width of waveguides 25 and 26 can be 10 μm to form a 10 μm×10 μm coupling area to physically abut to a single-mode fiber 31. At the other end, the waveguides 25 and 26 are connected to optical integrated circuits 34 and 35 using lateral spot-size converters 27 and 28. The spot-size converters 27 and 28 convert the fundamental TE-mode of a 10 μm ridge waveguide to the TE-mode of a single-mode ridge waveguide, which is 0.5 μm wide for this particular embodiment. In this embodiment, piecewise linear tapered waveguides are used. As is shown in FIG. 2, a first section 27a is a 200 μm long linear taper which is 10 μm wide at one end and 4 μm at the other end. A second section 27b is a 30 μm long linear taper which is 4 μm wide at one end and 0.5 μm at the other end. Spot-size converter 28 with sections 28a and 28b is substantially the same in form as spot-size converter 27.

Figure 5:
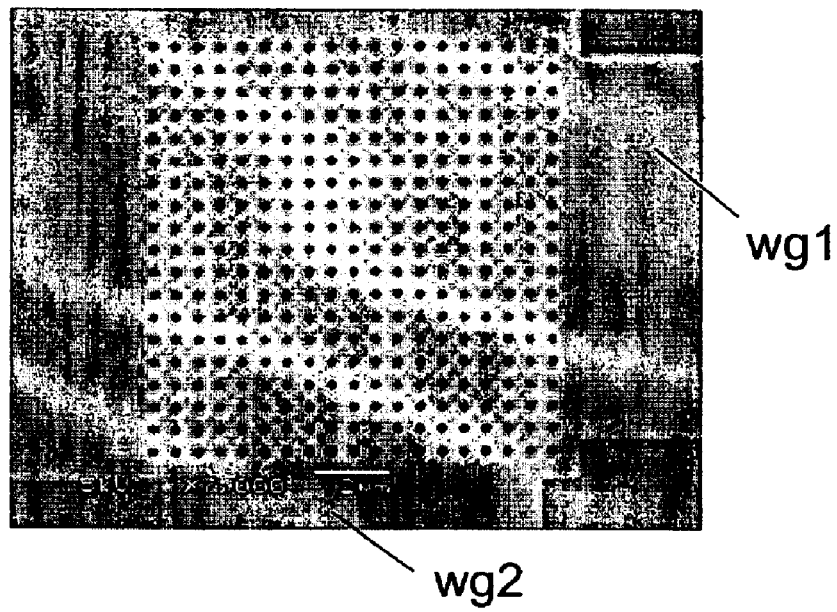
FIG. 5 is a scanning electron microscope (SEM) photo showing a top view of a grating structure having a square array of holes according to an embodiment of the invention.

In an alternative embodiment, optical couplers were fabricated on SOI wafers with a top silicon film thickness of 220 nm and a buried SiO$_2$ layer thickness of 1 μm. Gratings and waveguides were defined using electron beam lithography and reactive ion etching. Referring to FIG. 5, a scanning electron microscope (SEM) photo showing a top view of such a structure is shown. As has been described above, the diffraction grating structure is a square array of holes. For this embodiment, the etch depth was 90 nm and the lattice period was 580 nm. Various hole diameters for this implementation with the preferred hole diameter being approximately 300 nm. Also in this embodiment, the ridge waveguides are 10 μm wide. A 90-degree bend was inserted in the waveguide wg2 to be able to detect both outputs at one cleaved facet, as is illustrated in Section 'B' of FIG. 1.

In this respect, the structures shown in Section 'B' of FIG. 1 were used to measure the extinction ratio and check the polarization of the light in the waveguides wg1 and wg2. The extinction ratio is the ratio of the low, or OFF optical power level ($P_L$) to the high, or ON optical power level ($P_H$) and is shown by Equation 1 below.

$$\text{Extinction Ratio (\%)} = (P_L/P_H) \times 100. \quad \text{(Equation 1)}$$

A vertically positioned optical fiber was employed to couple light from a tunable laser into the waveguides wg1 and wg2 via the grating 50 in Section 'B' of FIG. 1. The output power of waveguides wg1 and wg2 was detected at the cleaved facet using a 40× objective and a power detector.

As a first step to obtaining these measurements, the optical fiber was aligned. To ensure that the center of the fiber was aligned with the center of the grating 50, the y-position was aligned using output 1 and the x-position was aligned using output 2. The alignments in the x and y-directions were done so that the outputs signal at output 1 and output 2 were approximately maximal. The height of the optical fiber above the sample for this example was approximately 10 μm.

Figure 6:
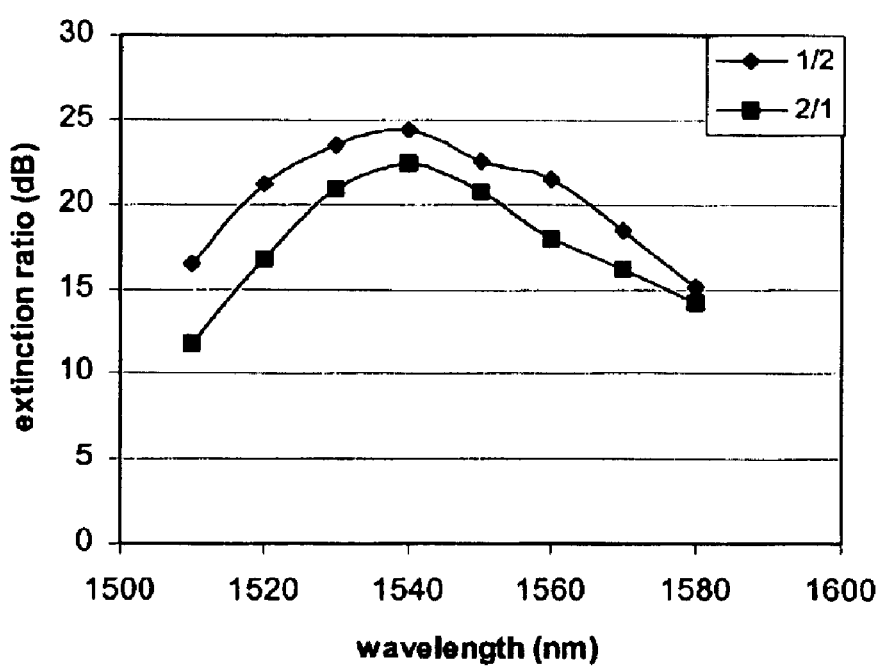
FIG. 6 is a graph that illustrates measurements of the extinction ratio of output 1 and output 2 as shown in Section 'B' of FIG. 1.

After the initial alignment, the position of the optical fiber was fixed and only the polarization and wavelength of incoming light were changed during the further measurements. The polarization of the input light was changed using a Lefevre type polarization controller to maximize output 1 or output 2. Then the extinction ratio between the 2 outputs was measured for both cases. The measured extinction ratios are shown in graphical form in FIG. 6 for different wavelengths. The extinction ratio was better than 18 dB in the wavelength range 1530–1560 nm. The difference between the 2 cases ($P_L/P_H=1/2$ and $P_L/P_H=2/1$) was caused by radiation losses in the 90-degree bend in the second waveguide wg2.

Figure 7:
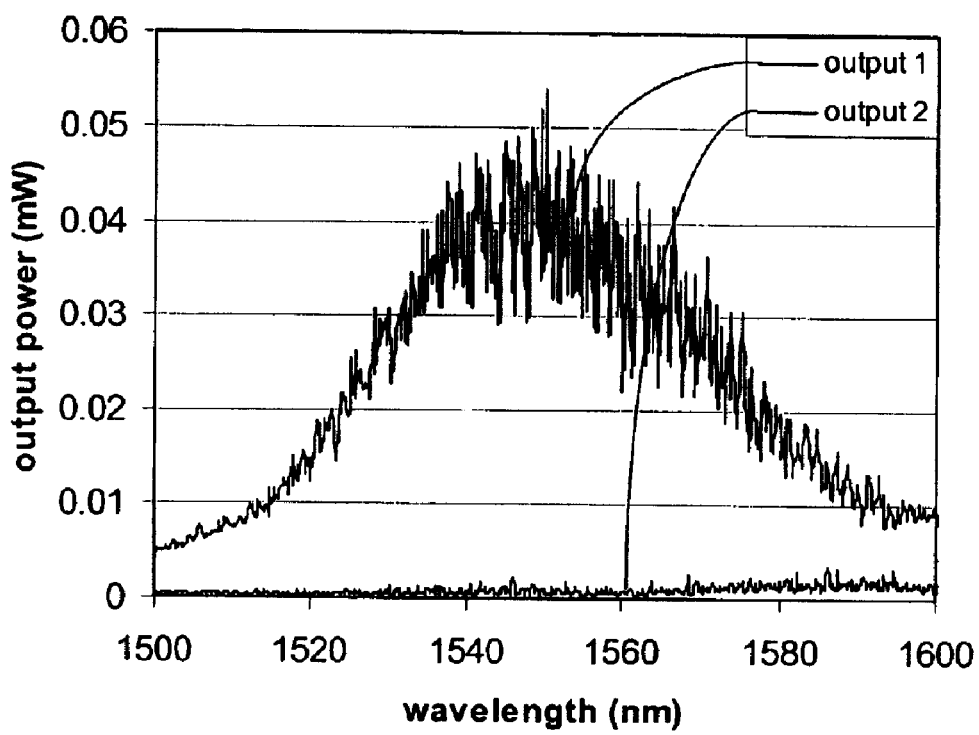
FIG. 7 is a graph that illustrates measured output power of output 1 and output 2 as shown in Section 'B' of FIG. 1 as a function of wavelength.

Also, the polarization of the light in the waveguides wg1 and wg2 was verified. The output power versus wavelength for the case when output 1 is maximized is shown in graphical form in FIG. 7. The fringes of the curves in FIG. 7 are the result of a cavity located between the grating and a cleaved facet.

Figure 8:
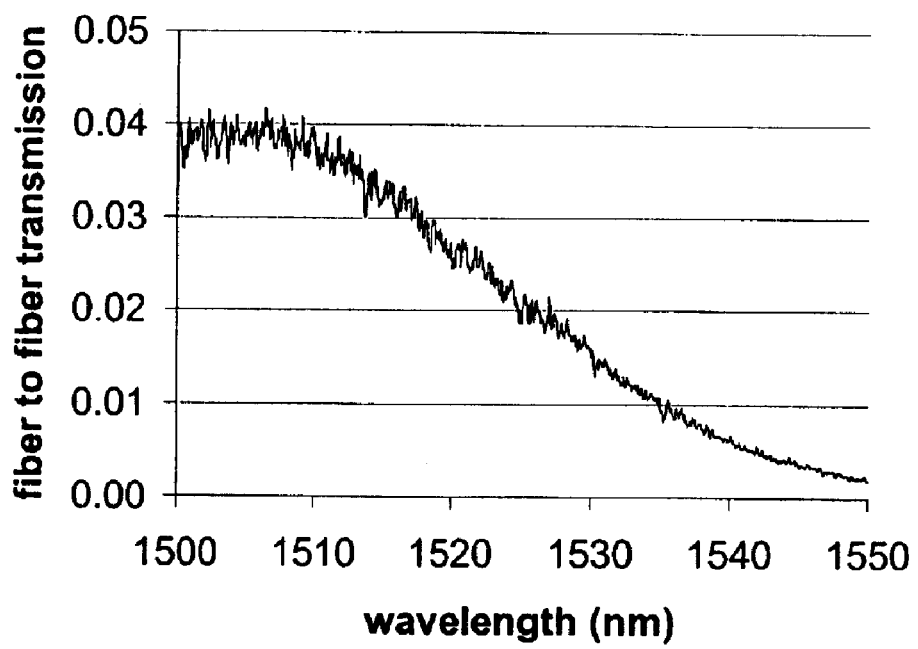
FIG. 8 is a graph of measured fiber-to-fiber transmission using the waveguide shown in Section 'C' of FIG. 1.

Referring now to FIG. 8, a graph of fiber-to-fiber transmission efficiency is shown. It is not straightforward to determine the coupling efficiency from the power detected at the cleaved facet because of the facet reflectivity and the high numerical aperture of the waveguides. Therefore, the coupling efficiency is estimated from a transmission measurement from fiber to waveguide to fiber using the structure shown in Section 'C' of FIG. 1, which consists of a ridge waveguide 53 with grating couplers 50 at both ends. For these measurements, the optical fibers were tilted slightly to shift the wavelength out of the second order grating reflection peak and thus avoid cavity effects between the two gratings. The fiber-to-fiber transmission is 4% for TE-polarization, so the coupling efficiency is 20% if account is taken of the fact that the coupling from fiber to waveguide is the same as from waveguide to fiber.

The embodiments of optical couplers described herein may be used to couple light from an optical fiber to a waveguide or from a waveguide to an optical fiber. The light from the optical fiber with a transversal E-field parallel to the line B–B' as shown in FIG. 2 is coupled into waveguide 25, in particular, it couples to the fundamental TE-mode in waveguide 25. The light from the optical fiber with transversal E-field parallel to line A–A' is coupled into waveguide 26 (TE-mode in the waveguide). The amount of light coupled in the waveguide 25 or the waveguide 26 will be dependent on the polarization of the light in the fiber. The photonic crystal 19 will act as a polarization splitter because of the high extinction ratio of coupling efficiency for TE versus TM-mode. In particular, the light from the optical fiber 23 is split into two planar waveguides 25 and 26 depending on the polarization of the light in the fiber, but in the waveguides 25 and 26 the light has the same polarization.

When using embodiments of optical couplers as described herein for both in-coupling and out-coupling, a photonic integrated circuit may be made polarization independent, such as by using a configuration such as the one that is schematically shown in FIG. 4. For this embodiment, photonic circuits 34 and 35 are identical and have a certain optical function (that is not polarization independent). When connecting the waveguide 25 to the photonic circuit 34 and the waveguide 26 to the photonic circuit 35 and connecting the other end of the photonic circuits 34 and 35 in an identical way to a second coupler device, the transmission from an input fiber 31 to an output fiber 36 will be independent of the polarization of the light in the fiber 31 if the photonic circuits 34 and 35 do not convert the state of polarization. Although the above has been explained using two optical fibers, the concept can be extended to any number of fibers.

Standard semiconductor processing techniques, such as lithography and etching techniques may be used to fabricate embodiments of optical couplers as described herein. Because, in general, the etch depth of the diffraction grating structures of the couplers, e.g. photonic crystals, is different from the etch depth of the ridge waveguides, forming such devices may employ two etch steps. In a first step, the diffraction grating structures may be fabricated and in a second step the ridge waveguides may be formed, preferably along with the rest of the optical circuitry. For the situation where active devices are to be integrated with such structures, additional processing steps are typically required. The diffraction grating structures of these embodiments, e.g. photonic crystals, are typically first defined in a resist layer by electron-beam lithography, optical (deep UV) lithography, or interferometric lithography (for periodic structures). The diffraction grating structure, e.g. photonic crystal structure, pattern is then formed in the substrate (core layer) by reactive ion etching (or any other suitable anisotropic dry etching technique).

It is to be understood that although preferred embodiments, specific constructions and configurations, as well as materials, have been discussed herein for devices according to embodiments of the invention, various changes or modifications in form and detail may be made without departing from the scope and spirit of this invention as defined by the appended claims. For example, although a first embodiment is described for GaAs material system, and a second embodiment is described for silicon on insulator (SOI), the invention can also be implemented using other materials such as InP, or any other suitable material.

What is claimed is:

1. A waveguide coupler, comprising:
    a substrate;
    a first waveguide formed on the substrate;
    a second waveguide formed on the substrate, wherein the first and second waveguides form a substantially right angle intersection;
    a diffraction grating structure formed at the intersection of the first and second waveguides; and
    an optical fiber coupled with the substrate by physical abutment with the intersection, the fiber being out of plane with the first and second waveguides.

2. The waveguide coupler of claim 1, wherein the diffraction grating structure is a two-dimensional grating.

3. The waveguide coupler of claim 2, wherein the two-dimensional grating comprises a periodic refractive index modulator.

4. The waveguide coupler of claim 3, wherein the periodic refractive index modulator comprises one of an array of holes and an array of rods.

5. The waveguide coupler of claim 1, wherein the first and second waveguides comprise ridge waveguides.

6. The waveguide coupler of claim 5, wherein the ridge waveguides each comprise at least one tapered portion, wherein the tapered portions function as lateral spot size converters.

7. The waveguide coupler of claim 1, comprising a slab waveguide horizontally formed on said substrate.

8. The waveguide coupler of claim 7, wherein said slab waveguide comprises a top layer with a lower refractive index than one or more underlying layers of the waveguide.

9. The waveguide coupler of claim 1, wherein said substrate comprises an additional stack of layers forming a substrate reflector under at least one of the first and second waveguides.

10. The waveguide coupler of claim 9, wherein the substrate reflector comprises a distributed Bragg reflector (DBR).

11. The waveguide coupler of claim 1, wherein said diffraction grating structure comprises a two-dimensional photonic crystal comprising a square lattice structure.

12. The waveguide coupler of claim 1, wherein the diffraction grating structure comprises one of a purely periodic grating structure and a substantially periodic grating structure.

13. The waveguide coupler of claim 1, further comprising a first lateral spot size converter formed with the first waveguide; and a second lateral spot-size converter formed with the second waveguide, wherein the first and second lateral spot-size converters couple the waveguide coupler to one or more integrated optical circuits.

14. The waveguide coupler of claim 1, wherein the coupler couples orthogonal optical modes from a single-mode optical fiber into an identical single mode in the two waveguides.

15. The waveguide coupler of claim 1, wherein the optical fiber is a single-mode optical fiber.

16. A photonic integrated circuit comprising:

an optical coupler, the optical coupler comprising:

a substrate;

a first waveguide formed on the substrate;

a second waveguide formed on the substrate, wherein the first and second waveguide form a right angle intersection; and a diffraction grating structure formed at the intersection of the first and second waveguides; and an optical fiber coupled with the substrate by physical abutment with the intersection, the fiber being out of plane with the first and second waveguides.

17. The circuit of claim 16, wherein the diffraction grating structure is a two-dimensional grating.

18. The circuit of claim 17, wherein the two-dimensional grating comprises a periodic refractive index modulator.

19. The circuit of claim 18, wherein the periodic refractive index modulator comprises one of an array of holes and an array of rods.

20. The circuit of claim 16, wherein said substrate comprises an additional stack of layers forming a substrate reflector under at least one the first and second waveguides, the substrate reflector comprising a distributed Bragg reflector (DBR).

21. The circuit of claim 16, wherein said diffraction grating structure comprises a two-dimensional photonic crystal comprising a square lattice structure.

22. The circuit of claim 16, further comprising first lateral spot size converter formed with the first waveguide; and a second lateral spot-size converter formed with the second waveguide;

wherein the first and second lateral spot-size converters couple the coupler to one or more photonic circuits included in the circuit.

* * * * *